United States Patent Office 3,518,165
Patented June 30, 1970

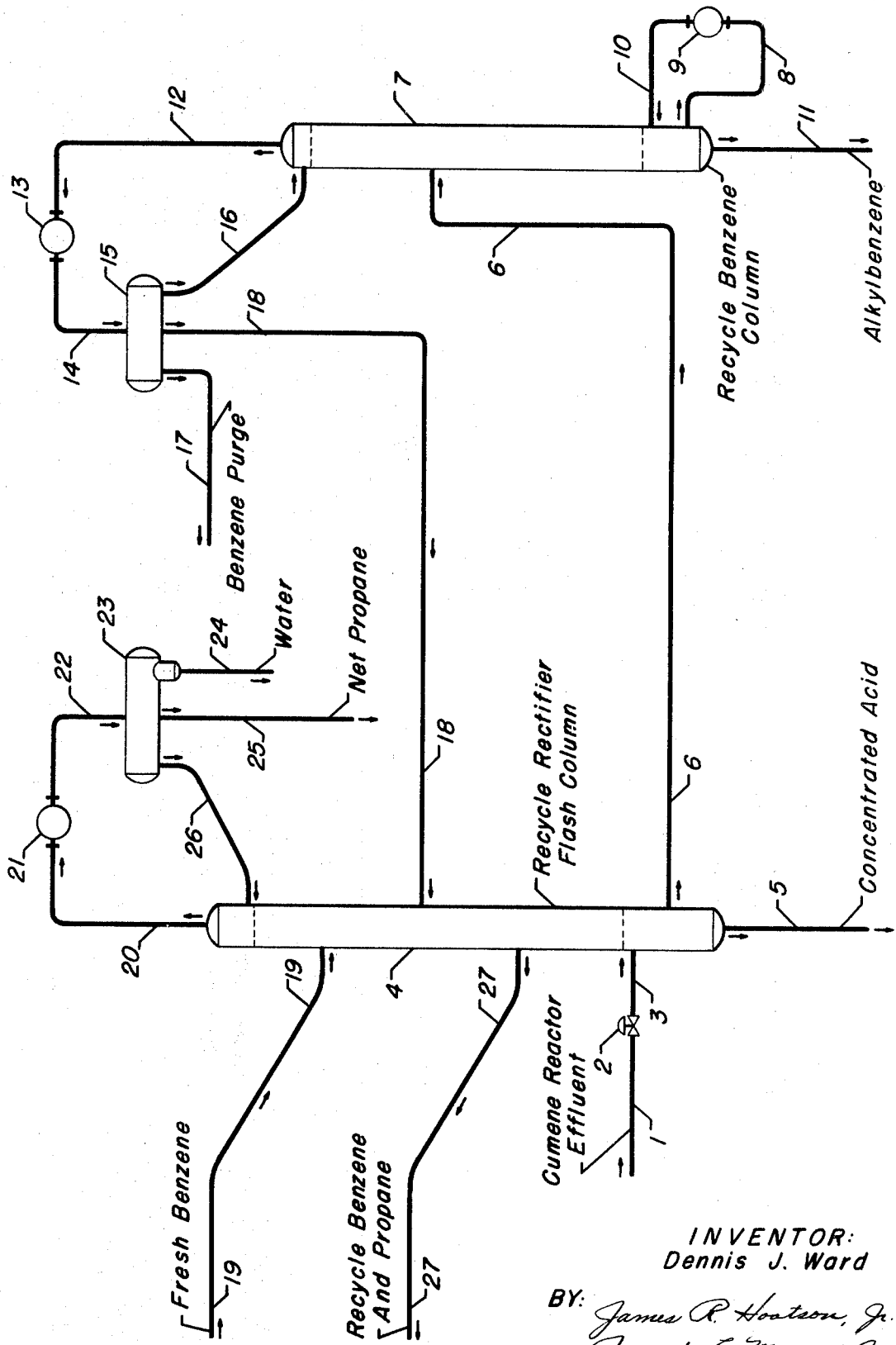

3,518,165
PROCESS FOR SEPARATING ALKYLATION EFFLUENT BY PLURAL STAGE DISTILLATION WITH BENZENE RECYCLE
Dennis J. Ward, Lombard, Ill., assignor to Universal Oil Products Company, Des Plaines, Ill., a corporation of Delaware
Filed Mar. 29, 1968, Ser. No. 717,099
Int. Cl. B01d 3/00
U.S. Cl. 203—78    6 Claims

ABSTRACT OF THE DISCLOSURE

Separation process for a reaction zone effluent, such as an aromatic alkylation reaction zone effluent. The effluent is passed into a rectified flash zone under conditions sufficient to provide an overhead fraction comprising diluent, a side-cut fraction comprising diluent and alkylatable aromatic compound, and a bottoms fraction comprising alkylatable aromatic compound and alkylated aromatic compound. The bottoms fraction is separated into an alkylatable aromatic fraction and an alkylated aromatic fraction. The alkylatable aromatic frction is returned to the rectified flash zone as reflux and the side-cut fraction therefrom is returned to the aromatic alkylation reaction zone, while the overhead fraction and the alkylated aromatic fraction are recovered. The process is equally effective in the separation of the effluent from an oligomerization reaction zone. Specific application of the process is in the synthesis of ethylbenzene, cumene, heptene, propylene-trimer, and propylene-tetramer.

FIELD OF INVENTION

The present invention relates to a separation process for recovery of product from a reaction zone effluent containing at least three components. The present invention particularly relates to the separation of the effluent from an alkylation reaction zone to provide a diluent for return to the reaction zone, a reactant for return to the reaction zone, and a product stream of alkylated aromatic compound. The inventive process also relates to the separation of the effluent from an oligomerization reaction zone to provide a diluent for return to the reaction zone, a stream of partially-oligomerized product for return to the reaction zone, and a product stream of oligomerized product. Most particularly, the present invention relates to a method of separation which results in an improved process for alkylation of benzene with an ethylene-ethane mixture, for alkylation of benzene with a propylene-propane mixture, for the oligomerization of propylene in a propylene-propane mixture, and for the co-oligomerization of propylene and butene in a reactive mixture containing propane and butane.

The present invention finds one broad application in the production of alkylated aromatic hydrocarbons for use in subsequent chemical synthesis. The present invention particularly finds application in the production of isopropyl-benzene, or cumene, which is utilized in the synthesis of phenol, acetone, alpha-methylstyrene, and acetophenone. These cumene-derived chemicals are intermediates in the synthesis of resins for plastics and nylons. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, poly-styrene and other plastics, as well as in the synthesis of styrene-butadiene rubber and in the formulation of coatings including latex paints. Application of the inventive process may also be found in the alkylation of substituted aromatics such as phenol, which when alkylated with isobutylenes forms O-tertiarybutylphenol which is an intermediate in the synthesis of other chemicals, and forms p-tertiarybutylphenol which is used to modify phenolformaldehyde resins. A further application of the inventive process upon substituted aromatic hydrocarbons may be found in the alkylation of para-hydroxyanisole with tertiary butyl alcohol or isobutylene to form butylated hydroxyanisole which finds utility as an antioxidant in the preservation of foods.

The present invention finds additional application in the oligomerization of olefin-acting compounds. Oligomerization of propylene may be undertaken to produce commercial fractions of propylene-trimer and propylenetetramer, within the scope of the inventive process. Trimer finds utility in the synthesis of nonyl-phenol detergents and in the synthesis of decyl alcohols by the Oxo Process. Tetramer is also used in the synthesis of detergents. The inventive process also finds application in the synthesis of commercial fractions of heptene which are produced by the co-oligomerization of propylene and butenes in a reaction mixture comprising propylene, propane, butene, and butane. Heptene is utilized in the synthesis of octyl alcohols by the Oxo Process. (It is to be noted that oligomerization of olefin hydrocarbons is more commonly referred to as "polymerization of olefins" in the petroleum refining industry.)

DESCRIPTION OF THE PRIOR ART

As indicated above, the present invention particularly relates to the recovery of isopropylbenzene, or cumene, from an alkylation reaction effluent. In the commercial manufacture of cumene it is the art to charge benzene and propylene into a reactor containing a solid phosphoric acid catalyst.

Because it is desired to minimize the dialkylation of benzene which produces di-isopropylbenzene by-product, it is the art to have a molar deficiency of propylene in the reaction zone, and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a Pyrolysis Plant, these diluents will normally be less than 10 mole persent, while a propylene feed derived from the gas recovery unit of a Fluid Catalytic Cracking Plant will often contain as much as 35 to 40 mole percent of unreactive diluents. In addition to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at several intermediate quench points between several catalyst beds. The alkylation effluent which leaves the typical reaction zone therefore contains a considerable amount of propane diluent. This diluent must be separated from the effluent in order that a portion may be recycled to the reaction zone and in order that a quantity may be withdrawn from the process. The quantity withdrawn is equivalent to the quantity which is being introduced into the process in the propylene-propane feed, and it must be withdrawn from the process in order to avoid accumulation of unreactive diluents in the process unit.

It is the art in the manufacture of cumene to charge the alkylation effluent to a fractionation train comprising a depropanizer column, a benzene column, and a cumene column. The effluent enters the depropanizer wherein the propane diluent is removed overhead to provide the propane recycle stream for return to the reaction zone and a net propane product stream which is normally withdrawn to the fuel gas system or sent to product storage as liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of non-aromatic contaminants which enter the process as trace constituents in the benzene feed. The benzene column bottoms stream passes to a cumene column which produces an overhead comprising high purity cumene product and a bottoms by-product comprising polyalkylated benzene.

In the typical oligomerization process, an olefin-acting compound is oligomerized in the presence of an unreactive diluent to produce a desired oligomerized product and partially-oligomerized product which must be separated therefrom. For example, in the production of propylene-tetramer a typical propylene-propane feed is oligomerized over a solid phosphoric acid catalyst to produce a reactor effluent usually comprising propane, propylene-dimer, propylene-trimer, propylene-tetramer, and propylene-pentamer. It is therefore necessary to depropanize the reactor effluent in order to provide a recycle diluent propane stream for catalyst temperature control and to recycle the propylene-dimer and propylene-trimer to the reaction zone for further oligomerization with propylene to produce additional product propylene-tetramer. It is well known to those skilled in the art, that the required separatiton of the reactor effluent is accomplished by passing the effluent into a series of fractionating columns comprising a depropanizer column, a column for obtaining the desired recycle fraction of partially-oligomerized product, and a column for recovery of the desired oligomerized product.

A similar series of fractionating columns is normally utilized in the separation of the reactor effluent resulting from the synthesis of heptene by co-oligomerization of propylene and butenes. The unreactive diluent which must be recycled to the reactor for temperature control normally comprises a mixture of propane and butane. Because the olefinic feed contains propylene, butenes, and possible traces of other olefins, the reactor effluent will contain hexenes, heptenes, octenes, and heavier oligomerization products. It is the art to recover heptenes and octenes as the product fraction and to recycle hexenes and lighter olefins for additional oligomerization.

SUMMARY OF THE INVENTION

It is an object of the present invention to provide a method for the separation of a process stream containing at least three components. It is a further object of the present invention to provide a process for the separation of a reaction zone effluent. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner. These and other objectives will be readily ascertained from the following description and the attached drawing which is a simplified flow diagram setting forth one specific embodiment of the invention.

In accordance with these objectives, a broad embodiment of this invention may be characterized as a process for separating an organic chemical mixture which comprises passing the mixture to a rectified flash zone maintained under separation conditions; withdrawing therefrom an overhead fraction, a side-cut fraction, and a bottoms fraction; returning a portion of the bottoms fraction to the rectified flash zone as reflux; and recovering at least a portion of the overhead fraction and at least a portion of the bottoms fraction.

A more particular embodiment of the present invention may be characterized as a process for separating a reaction zone effluent containing at least three components which comprise passing the effluent from a reaction zone into a rectified flash zone maintained under separation conditions; withdrawing from the rectified flash zone a first fraction comprising a first component, a second fraction comprising a first portion of a second component, and a third fraction comprising a second portion of the second component and a third component; passing the third fraction to a separation zone maintained under separation conditions; withdrawing from the separation zone at least a fourth fraction comprising second component and a fifth fraction comprising third component in high concentration; passing at least a part of the fourth fraction into the rectified flash zone; passing the second fraction into the reaction zone; and recovering the fifth fraction.

A preferred embodiment of the present invention may be characterized by this separation process wherein the reaction zone comprises an alkylation reaction zone, the first component comprises an unreactive diluent, the second component comprises an alkylatable aromatic compound, and the third component comprises an alkylated aromatic compound.

A further preferred embodiment of the present invention may be characterized by this separation process wherein the reaction zone comprises an oligomerization reaction zone, the first component comprises an unreactive diluent, the second component comprises partially-oligomerized product, and the third component comprises oligomerized product.

These and other more specific embodiments will be more clearly set forth hereinafter. An understanding of the present invention may now be readily obtained by referring to the accompanying drawing which sets forth a simplified flow for carrying out one specific example wherein the process of the present invention is practiced.

DRAWING AND EXAMPLE

As previously noted, the particularly preferred embodiment of this invention comprises the inventive process wherein the alkylatable aromatic compound is benzene, the olefin-acting alkylating agent is propylene, the unreactive diluent is propane, and the desired monoalkylated aromatic compound is high purity cumene. Referring now to the drawing, propylene is reacted with benzene over a solid phosphoric acid catalyst in a reaction zone, not shown, under alkylation reaction conditions.

The resulting cumene reactor effluent enters the separation process of the present invention via line 1 at a rate of 3368.9 mols/hr., at a pressure of 500 p.s.i.g., and at a temperature of 460° F. (As used herein mols/hr. refers to pound moles per hour.) The effluent comprising propane, benzene, cumene, and heavy alkyl benzenes passes through a pressure reduction valve 2 and enters a Recycle Rectified Flash Column 4 via line 3 wherein the reactor effluent is flashed at a pressure of 245 p.s.i.g., and at a temperature of 410° F. The effluent enters the recycle rectified Flash Column 4 at a lower locus below a series of typical fractionation trays wherein the hot vapor produced by the flashing is rectified. The processing of the hot flash vapor will be discussed in detail hereinafter.

The hot liquid portion of the flashed effluent is accumulated at the bottom of Recycle Rectified Flash Column 4 wherein two liquid phases are established. A more dense phase of the liquid is removed from Recycle Rectified Flash Column 4 via line 5. The more dense liquid comprises a concentrated aqueous solution of phosphoric acid which is leached off of the solid phosphoric acid catalyst in the reaction zone. The stream normally amounts to about one gallon per day of concentrated phosphoric acid and is sent to a disposal system, not shown. The major portion of the liquid comprising the less dense phase is removed from the bottom of Recycle Rectified Flash Column 4 via line 6 at a rate of 1965.3 mols/hr. The less dense liquid comprises unvaporized hydrocarbon constituents of the reactor effluent and is substantially free of propane while containing benzene and substantially all of the alkylated benzene of the reactor effluent.

The liquid hydrocarbon fraction is withdrawn from Recycle Rectified Flash Column 4 via line 6 at a temperature of 390° F., and at a pressure of 245 p.s.i.g. This liquid is passed through a control valve, not shown, and enters a Recycle Benzene Column 7 at a temperature of 245° F. and a pressure of 18 p.s.i.g. Recycle Benzene Column 7 is maintained under conditions sufficient to separate the unreacted benzene from the alkylated benzene products of the effluent. The column is provided with a typical reboiler circuit and a portion of the bottoms liquid is passed from Recycle Benzene Column 7 into a reboiler 9 via line 8 at 375° F. The bottoms liquid is reboiled therein and passed back to column 7 via line 10 at a temperature of 375° F. and a pressure of 21 p.s.i.g. A second portion of the bottoms liquid is withdrawn from Recycle Benzene Column 7 via line 11 at a temperature of 375° F. The stream comprises alkylbenzene product having substantial freedom from benzene and is passed to a subsequent cumene fractionation column, not shown, at a rate of 292.1 mols/hr. The cumene column separates the alkylbenzene product to provide 282.4 mols/hr. of high purity cumene and 9.7 mols/hr. of heavy alkylbenzene by-product.

A vapor fraction is withdrawn from the top of Recycle Benzene Column 7 via line 12 at a rate of 3470.4 mols/hr. The vapor comprising benzene and having substantial freedom from alkylated benzene enters condenser 13 at 225° F. and 15 p.s.i.g. wherein it is condensed and cooled. The condensed benzene passes from condenser 13 via line 14 into receiver 15 at a temperature of 100° F. and a pressure of 10 p.s.i.g. The liquid benzene is withdrawn in three portions from receiver 15. A first portion is passed back to Recycle Benzene Column 7 via line 16 at a rate of 1797.2 mols/hr. to provide the reflux therein. A second portion is withdrawn via line 17 at a rate of 5.2 mols/hr. as a benzene purge stream which is sent to a benzene recovery system, not shown. The benzene purge stream is typical in the art and is necessary in order to avoid the accumulation of unreactive hydrocarbon constituents within the aromatic alkylation process. The unreactive constituents normally enter the aromatic alkylation process as trace contaminants in the fresh benzene feed.

A third portion of the liquid benzene is withdrawn from receiver 15 via line 18 at a rate of 1668.0 mols/hr. and is sent back to Recycle Rectified Flash Column 4 as a reflux stream at a temperature of 100° F. As the hot flash vapor portion of the reactor effluent passes up from the bottom through the fractionation decks in Recycle Rectified Flash Column 4, it is contacted with downflowing relatively cool benzene liquid. The vapor is thereby rectified within column 4 to provide that substantially no alkylalted benzene will remain in the vapor phase and that virtually all alkylbenzene will be withdrawn with the hot bottoms liquid via line 6.

As the rectified vapor rises in Recycle Rectified Flash Column 4, a side-cut fraction is withdrawn therefrom via line 27 at a rate of 3218.6 mols/hr., at a temperature of 300° F. and a pressure of 240 p.s.i.g. The side-cut fraction comprises 2341.2 moles of benzene and 877.4 moles of unreactive diluent comprising propane. The side-cut fraction is returned to the alkylation reaction zone via line 27 wherein it is combined with a propylene-propane feed to produce a reactor charge which reacts in the reaction zone to produce the cumene reactor effluent entering the inventive process via line 1 as noted hereinabove.

As the hot rectified vapor continues to rise in Recycle Rectified Flash Column 4 above the locus wherefrom the side-cut fraction is withdrawn via line 27, it is contacted with the cold benzene reflux which has been returned from Recycle Benzene Column 7 via line 18 as previously noted. As the vapor continues to rise within the rectification zone of column 4, it is contacted with a second cold reflux which enters the column via line 19. This second cold reflux comprises 297.0 mols/hr. of fresh benzene at a temperature of 104° F. The fresh benzene provides the aromatic reactant which is subsequently consumed in the alkylation reaction zone to produce the desired cumene product. The fresh benzene contains traces of water and is typically introduced into the separation zone of the aromatic alkylation process rather than being introduced directly into the reaction zone since excessive amounts of water are detrimental to the solid phosphoric acid which is contained therein. It is, therefore, typical in the art to introduce the fresh benzene reactant into the aromatic alkylation reaction unit at the prior art depropanizer column wherein it may be suitably dried prior to its introduction into the alkylation reaction zone. As the hot vapor rises up through Recycle Rectified Flash Column 4, the fresh benzene which enters the column via line 19 is stripped of all water content while providing a means of rectifying the hot upflowing vapor.

A final hot rectified vapor leaves the top of Recycle Rectified Flash Column 4 via line 20 at a rate of 1456.0 mols/hr. The hot vapor comprises propane which is substantially free of any benzene or other normally liquid hydrocarbons, and it enters condenser 21 at a temperature of 120° F. and a pressure of 230 p.s.i.g. The vapor is condensed and cooled therein, and it is then passed via line 22 into separator 23 at a pressure of 225 p.s.i.g. and a temperature of 100° F. Two liquid phases are established within separator 23 comprising an aqueous phase and a hydrocarbon phase. The aqueous phase results from the traces of water which enter the process in the fresh benzene feed via line 19. The accumulation of this trace water is withdrawn from separator 23 via line 24 and sent to disposal, not shown.

A part of the hydrocarbon fraction which is accumulated in receiver 23 is withdrawn therefrom via line 26 at a rate of 1306.0 mols/hr. and is passed back to Recycle Rectified Flash Column 4 to provide a propane reflux in the top region of the rectification zone. A second portion of the hydrocarbon fraction is withdrawn from separator 23 via line 25 at a rate of 150.0 mols/hr. This fraction comprises a net propane product and is equivalent to the unreactive constituents which typically enter the inventive process with the propylene reactant at the reaction zone by means not shown. The net propane product will be normally sent to LPG product storage or to a fuel gas system.

PREFERRED EMBODIMENTS

Several important advantages of the inventive process may be readily ascertained from the foregoing process description. In particular, these advantages comprise savings in utility expense and capital cost of the inventive process over the prior art.

The first advantage which will be readily seen is that the thermal energy of the reactor effluent is most effectively utilized by the process of the present invention. It will be seen that the hot effluent imparts its thermal energy by direct contact of various fluids within the Recycle Rectified Flash Column without the use of heat exchanger devices. In particular, the hot flashed vapor of the reactor effluent provides the means of preheating the benzene and propane which is returned to the reaction zone via line 27 by a direct contact of hot vapor with cool refluxing liquids on the fractionating trays of column 4. In addition, it will be seen that the thermal energy of the reactor effluent provides for a part of the fractionation of the benzene which is recycled to the reactor since the hot flashed vapor, which leaves the bottom of column 4 and passes up through the fractionating decks, contains about one third of the benzene of the reactor effluent as a vapor. This one third portion is rectified in column 4 and substantially all alkylbenzenes are removed therefrom. In addition, it will be seen that the hot flash vapor of the effluent provides the means by which the fresh input benzene of line 19 is rendered substantially dry. Finally, it will be noted that the thermal energy of a hot reactor effluent provides the means of rectifying the net propane which is removed overhead from Recycle Rectified Flash Column 4.

It must also be pointed out that there is a considerable saving of heat input by the use of the Recycle Rectified Flash Column because the recycle propane does not pass through the column as an overhead vapor product. If the propane recycled to the reactor were the typical overhead product of the prior art depropanizer column, a considerable addition of reflux would be required in order to make high purity propane recycle, since the net overhead product propane which leaves the column via line 25 must be benzene free for use as a fuel gas or as LPG. The propane which is recycled may be allowed to contain considerable amounts of benzene, however, since it is the art to return benzene to the alkylation reactor. If the propane recycle is an overhead product, it is forced to meet the purity specifications of the product propane, thus adding reflux and utility expense with no beneficial result to the process. The present invention eliminates this wasteful utility cost by removing the propane in the side-cut stream via line 27.

In addition, the Recycle Rectified Flash Column provides a reduction in capital cost over the prior art separation process wherein the typical depropanizer is utilized. First of all, it will be noted that the present invention eliminates the reboiler circuit of the prior art depropanizer column. Additionally, since the amount of propane removed as overhead vapor from Recycle Rectified Flash Column 4 is substantially less than the amount of vapor produced in the prior art depropanizer column, as noted hereinabove, the overhead condenser system of the present invention is substantially reduced in size. Finally, since the hot reactor effluent is introduced directly into the Recycle Rectified Flash Column of the present invention and since its thermal energy is effectively utilized by direct contact of the vapor and liquids within the fractionation trays, the inventive process eliminates the prior art heat exchanger system wherein hot effluent is exchanged with cold reactor feed.

There are similar savings in the capital cost and the utility expenses to be realized at the Recycle Benzene Column of the present invention. It will be seen that about one third of the benzene recycle is flashed into the rectification zone of the Recycle Rectified Flash Column as a portion of hot flashed vapor, and that this portion of the reactor effluent is removed as a side-cut therefrom without having first passed through Recycle Benzene Column. This results in a reduced loading at the Recycle Benzene Column for not only is the feed thereto reduced but the amount of reflux required within the Recycle Benzene Column is reduced accordingly. Thus, the column diameter, overhead condensing system, reboiler system, and other auxiliary equipment may by significantly reduced in size due to the reduced column loading. Not only is the capital cost reduced for this equipment, but the utility expense for operating the Recycle Benzene Column is also reduced.

Other advantages in addition to those set forth hereinabove will be apparent to those skilled in the art.

While the embodiment set forth has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols, in the presence of an unreactive diluent.

It must be noted that the Recycle Rectified Flash Column 4 was maintained at flash conditions of 410° F. and 245 p.s.i.g. in the example given, but that these conditions are specific to the example. The overall conditions of reflux rate, temperature, and pressure within Recycle Rectified Flash Column 4 may be adjusted to give the desired separation between liquid and vapor in the effluent. Preferably, these conditions will provide that about one third to two thirds of the benzene in the reactor effluent will flash into the vapor phase and that two thirds to one third will remain in the liquid phase. However, the liquid-vapor split may be shifted up or down as desired by choice of the unreactive propane diluent in the vapor phase and that substantially all of the alkylated benzene remains in the liquid phase. Thus, it is within the scope of the process of the present invention that the flash vapor at the bottom of column 4 will contain substantially all of the unreactive propane vapor diluent and that it may contain from about 10% to about 90% of the unreacted benzene, while the flash liquid in line 6 may correspondingly contain from about 90% to about 10% of the benzene and substantially all of the alkylated benzene.

The primary control of the separation of the effluent into liquid and vapor is the amount of pressure drop to which the effluent is subjected upon leaving the reaction zone and entering the flash zone comprising the bottom of Recycle Rectified Flash Column 4. As noted above, it is preferable that the pressure drop, or flashing, should provide that about one third to two thirds of the benzene is in the vapor phase and two thirds to one third is in the liquid phase. Although the alkylation reaction may occur at pressures in excess of 1000 p.s.i.g., little or no flashing of vapor would occur at such pressure in the flash zone of Column 4, and since the cost of fabricating the vessel for the flash zone would be excessive at such a pressure level, it is advantageous to keep the pressure at about 500 p.s.i.g. or below.

It will be noted that the side-out fraction leaving Recycle Rectified Flash Column 4 via line 27 comprises the benzene and propane which is passed into the reactor zone at an elevated pressure. Additionally, the net propane product which is removed via line 25 is typically introduced into a fuel gas system or into a LPG recovery unit. Consequently, it is important not to operate the Recycle Rectified Flash Column at a pressure which is too far below the pressure of the subseqeunt zones whereto these streams are introduced. Therefore, the pressure within Recycle Rectified Flash Column 4 should normally be maintained in a range of from about 200 p.s.i.g. to about 500 p.s.i.g. It is particularly preferable that the pressure be sufficiently high to transfer the net propane product of line 25 without the assistance of pumps or compressors. Thus, it is preferable that the Recycle Rectified Flash Column 4 be maintained at a pressure of from about 200 to 500 p.s.i.g. and more specifically, that the pressure be maintained at from 200 p.s.i.g. to 300 p.s.i.g. when applied to cumene production.

The temperature within the Recycle Rectified Flash Column 4 will be substantially at the flash point of the reactor effluent for the specific reactor effluent composition and for the specific pressure within the flash zone. The temperature will always be below the reactor outlet temperature since the flashing of the effluent will cause a substantially adiabatic temperature drop. Those skilled in the art will realize, however, that the temperature at the top of the Recycle Rectified Flash Column 4 will always be below the flash temperature which exists at the bottom of the column below the rectification section, since reflux contacts the upflowing vapor before it leaves the top of the column. The temperature within the Recycle Rectified Flash Column 4 will, therefore, normally be in the range of from about 250° F. to about 500° F. at the bottom of the column in the flashing zone, and in the range of from 100° F. to 250° F. at the top of the column in the zone of rectification. Broadly speaking, the overall temperature in column 4 will preferably be in the range of from 100° F. to about 425° F. for cumene production.

It must be noted that the withdrawal of the side-cut from the Recycle Rectified Flash Column to provide a hot propane and benzene stream for return to the alkylation reaction zone comprises an integral part of the inventive separation process, and that this side-cut stream may be withdrawn as a vapor or a liquid fraction. The location for the withdrawal of this side-cut stream may be varied as the composition of the side-cut will require. It is preferable that the location be such that the side-cut stream will be relatively free of cumene since any cumene which is recycled to the reactor may be dialkylated to produce undesired diisopropylbenzene by-product. It is particularly desirable that the cumene content be maintained below 5 mole percent and, preferably, below one mole percent. The exact tray location within the Recycle Rectified Flash Column where the composition will meet these ranges or any particular required composition is readily ascertainable by those required in the art of fractionation design in multi-component systems.

It should be noted that the foregoing discussion concerning the operating conditions required within the Recycle Rectified Flash Zone are particularly applicable to the separation of an effluent wherein the subsequent fractionation columns are operated at superatmospheric and atmospheric pressures. It is well known, however, that in alkylating substituted aromatic compounds it is often necessary to fractionate the effluent in a train of columns maintained at subatmospheric pressure. A typical example of such subatmospheric separation is found in the production of butylated hydroxyanisole from the effluent which results in alkylating p-hydroxyanisole with tertiary butyl alcohol. When the Recycle Rectified Flash Zone of the present invention preceeds a subatmospheric fractionation train, it may be maintained at superatmospheric or subatmospheric pressure as may be required to accomplish the particular degree of separation which is desired.

The specific operating conditions which may be requred within the Recycle Rectified Flash Zone of the present invention are readily ascertainable for any given reactor effluent composition by those skilled in the art utilizing the teachings which have been presented hereinabove.

It is to be noted that the integrated fractionation column of the example comprises a Recycle Benzene Column. The operating conditions within this fractionation column are specific for the process set forth in the example, and the operating conditions which may be necessary for any other reactor effluent composition will be readily ascertainable by those skilled in the art. It is not, therefore, necessary within the description of this invention to discuss broad operating ranges which are required for such a benzene fractionation column or for the cumene column which is required in the overall process but which was not shown in the drawing.

It should be noted that in the example set forth a solid phosphoric acid catalyst was used in the reaction zone for alkylation of the aromatic. Since aromatic hydrocarbons leach water and phosphoric acid from such catalyst, provision must therefore be made for removal of concentrated phosphoric acid as indicated via line 5. Where other catalyst systems are used in the inventive process such provision for acid removal from the bottom of the Recycle Rectified Flash Column and from the process may not be necessary.

It will be readily seen that the inventive separation process as set forth in the drawing and example above, wherein cumene is recovered from an aromatic-alkylation reactor effluent is equally applicable to the separation of an effluent from an oligomerization reactor as, for example, in the recovery of propylene-trimer, propylene-tetramer, or heptene fractions. Those skilled in the art will perceive that partially-oligomerized product will be returned to the Recycle Rectified Flash Column via line 18 but that no liquid will be introduced via line 19. However, a side-cut of propane and partially-oligomerized product will be withdrawn via line 27 and returned to the reaction zone for further reaction with olefin to produce the desired fully oligomerized product. The benefits which accrue to the cumene process by utilization of the inventive separation process are therefore equally realized when applying the present invention to the synthesis of commercial heptene fractions, propylene-trimer, and propylene-tetramer.

From the foregoing discussion, it may now be summarized that a particularly preferred embodiment of the present invention is a process for recovery of alkylated aromatic compound which comprises: passing an alkylation effluent, comprising unreactive diluent, alkylatable aromatic compound, and alkylated aromatic compound, from an alkylation reaction zone into a rectified flash zone maintained at a pressure in the range of from about 200 p.s.i.g. to about 500 p.s.i.g. and at a temperature in the range of from about 100° F. to about 500° F., withdrawing from the rectified flash zone a first fraction comprising diluent, a second fraction comprising alkylatable aromatic compound, and a third fraction comprising alkylatable aromatic compound and alkylated aromatic compound; passing the third fraction to a separation zone maintained under separation conditions; withdrawing from the separation zone at least a fourth fraction comprising alkylatable aromatic compound, and a fifth fraction comprising alkylated aromatic compound in high concentration; passing at least a part of the fourth fraction into the rectified flash zone; passing the second fraction into the reaction zone; and recovering the fifth fraction.

The invention claimed:

1. Process for recovery of alkylated aromatic hydrocarbon selected from the group consisting of ethylbenzene and cumene which comprises:
(a) passing an alkylation reaction effluent comprising, in increasing order of boiling point, unreactive diluent, benzene and said alkylated aromatic hydrocarbon, at elevated temperature and pressure, through pressure reduction means and thence into the lower portion of a non-reboiled vertical flash zone maintained at a lower pressure in the range of from about 200 p.s.i.g. to about 500 p.s.i.g. and at a temperature in the range of from about 100° F. to about 500° F., the degree of said pressure reduction being sufficient to flash substantially all of said diluent and from about 10% to about 90% of the benzene present in the effluent into the vapor phase;
(b) passing the resulting hot vapor upwardly through said flash zone in direct contact with hereinafter specified condensate and separating the effluent in said flash zone into a first fraction comprising said diluent, a second fraction comprising diluent and benzene, and a third fraction comprising benzene and said alkylated aromatic hydrocarbon;

(c) withdrawing the first fraction from the upper portion, the second fraction from an intermediate portion and the third fraction from the lower portion of said flash zone;

(d) passing the third fraction to a distillation zone and therein vaporizing benzene from alkylated aromatic hydrocarbon;

(e) condensing the vaporized benzene from the distillation zone and introducing at least a portion of the resultant condensate to an intermediate point in the height of said flash zone above the locus of withdrawal of said second fraction; and (f) withdrawing and recovering unvaporized alkylated aromatic hydrocarbon from the lower portion of said distillation zone.

2. Process of claim 1 wherein said alkylated aromatic hydrocarbon comprises ethylbenzene and said diluent comprises ethane.

3. Process of claim 1 wherein said alkylated aromatic hydrocarbon comprises cumene and said diluent comprises propane.

4. Process of claim 1 wherein a part of said first fraction is returned to the upper portion of said flash zone.

5. Process of claim 4 wherein said first fraction is withdrawn from said flash zone at an upper locus, said part of the first fraction is returned thereto at a first locus below said upper locus, said condensate is returned thereto at a second locus below said first locus, said second fraction is withdrawn therefrom at a third locus below said second locus, said effluent is passed thereto at a feed locus below said third locus, and said third fraction is withdrawn therefrom at a lower locus below said feed locus.

6. Process of claim 5 wherein fresh benzene is introduced into said flash zone at a fourth locus intermediate to said first locus and said second locus.

References Cited

UNITED STATES PATENTS

| | | | |
|---|---|---|---|
| 2,658,863 | 11/1953 | Guala | 203—88 |
| 2,694,095 | 11/1954 | Medcalf et al. | |
| 2,787,648 | 4/1957 | King. | |
| 2,818,452 | 12/1957 | Mavity. | |
| 2,992,168 | 7/1961 | Wilson et al. | 203—78 |
| 3,031,384 | 4/1962 | Sirois et al. | 203—98 |
| 3,046,316 | 7/1962 | Gudelis | 260—683.15 |
| 3,209,051 | 9/1965 | Bauer et al. | 260—671 |
| 3,230,156 | 1/1966 | Katzen | 203—78 |
| 3,255,269 | 6/1966 | Gilman et al. | 260—671 |
| 3,399,120 | 8/1968 | Lovett | 203—84 |

WILBUR L. BASCOMBE, JR., Primary Examiner

U.S. Cl. X.R.

260—671, 674; 203—80, 98, 99, 88